US009538401B1

United States Patent
Ouyang et al.

(10) Patent No.: US 9,538,401 B1
(45) Date of Patent: Jan. 3, 2017

(54) CELLULAR NETWORK CELL CLUSTERING AND PREDICTION BASED ON NETWORK TRAFFIC PATTERNS

(71) Applicant: Verizon Patent and Licensing Inc., Arlington, VA (US)

(72) Inventors: Ye Ouyang, Piscataway, NJ (US); Carol Becht, Boonton, NJ (US); Krishna Pichumani Iyer, Basking Ridge, NJ (US); Lily Zhu, Paarsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/975,116

(22) Filed: Dec. 18, 2015

(51) Int. Cl.
*H04W 24/02* (2009.01)
*H04W 16/22* (2009.01)
*H04W 16/24* (2009.01)

(52) U.S. Cl.
CPC ............. *H04W 24/02* (2013.01); *H04W 16/22* (2013.01); *H04W 16/24* (2013.01)

(58) Field of Classification Search
CPC ....... H04W 16/22; H04W 16/24; H04W 24/02
USPC .................. 455/405, 414.1, 418–420, 422.1, 423,455/446, 450
See application file for complete search history.

(56) References Cited

U.S. PATENT DOCUMENTS

| 2012/0094710 | A1* | 4/2012 | Jia ........................ H04W 72/044 455/524 |
| 2013/0244682 | A1* | 9/2013 | Schoenerstedt ....... H04W 24/00 455/452.1 |
| 2013/0331109 | A1* | 12/2013 | Dhillon ................. H04W 24/02 455/446 |
| 2016/0014634 | A1* | 1/2016 | Liu ........................ H04W 24/08 370/232 |

OTHER PUBLICATIONS

PR Newswire, "Global LTE Technology Assessment, Market Analysis, and Forecasts 2014-2019," http://www.prnewswire.com/news-releases/global-lte-technology-assessment-market-analysis-and-forecasts-2014---2019-300090544.html, May 28, 2015, 3 pages.
3rd Generation Partnership Project, "3GPP TS 32.451 V10.0.0 (Mar. 2011): 3rd Generation Partnership Project; Technical Specification Group Services and System Aspects; Telecommunication management; Key Performance Indicators (KPI) for Evolved Universal Terrestrial Radio Access Network (E-UTRAN); Requirements (Release 10)," http://www.qtc.jp/3GPP/Specs/32451-a00.pdf, Mar. 2011, 13 pages.

\* cited by examiner

*Primary Examiner* — Michael Mapa

(57) ABSTRACT

A device may receive an initial set of network parameter values, associated with cells of a cellular network, that are measured or calculated based on communications associated with the cells of the cellular network. The device may determine a set of feature values, associated with the cells of the cellular network, using the initial set of network parameter values. The device may cluster the cells of the cellular network into a first group of clusters using a first clustering (Continued)

technique, and may cluster the cells of the cellular network into a second group of clusters using a second clustering technique. The device may cluster the cells of the cellular network into a final group of clusters based on the first group of clusters and the second group of clusters, and may output information associated with the final group of clusters of the cells of the cellular network.

20 Claims, 5 Drawing Sheets

US 9,538,401 B1

CELLULAR NETWORK CELL CLUSTERING AND PREDICTION BASED ON NETWORK TRAFFIC PATTERNS

BACKGROUND

A cellular network may refer to a communications network where the last link to an end user device is a wireless link. The cellular network may be distributed over geographic regions referred to as cells, where each cell is served by at least one fixed-location transceiver, sometimes referred to as a base station. The base station may provide the cell with network coverage, which may be used for transmission of voice traffic, data traffic, or other traffic. In a cellular network, different cells may use different sets of radio frequencies from neighboring cells to avoid interference and provide guaranteed bandwidth within each cell. When joined together, these cells may provide radio coverage over a wide geographic area. This enables a large number of portable transceivers (e.g., mobile phones) to communicate with one other and/or with other devices in the network even if some of the transceivers move from one cell to another while communicating.

DETAILED DESCRIPTION OF PREFERRED EMBODIMENTS

The following detailed description of example implementations refers to the accompanying drawings. The same reference numbers in different drawings may identify the same or similar elements.

With the development of high speed wireless communications and the rapid growth of mobile phones, the amount of traffic communicated via cellular networks has increased, creating a need for increased network capacity and improved performance. Furthermore, there are a variety of services that may be provided via a cellular network, including voice services, video services, data services, or the like, which require increased network capacity to maintain an optimal network service quality. However, network capacity is limited by infrastructure deployment, and heavy network resource consumption may lead to high congestion, low quality of service, a high blocking error rate, or the like. Cellular network operators may want to collect a large amount of data regarding network usage in various cells so as to improve the operation of cellular networks. However, network capacity and performance is not homogeneous among cells of the network, as different regions may be subject to different usage characteristics.

Implementations described herein assist cellular network operators in clustering cells with similar characteristics, and in analyzing those clusters of cells to predict network parameters in the cell clusters. By clustering cells, computing resources, such as power resources, channel element resources, or the like, may be conserved as compared to storing and processing a large volume of data for all cells. Furthermore, by predicting network parameters, the network may be configured to improve network performance.

Figure 1A:
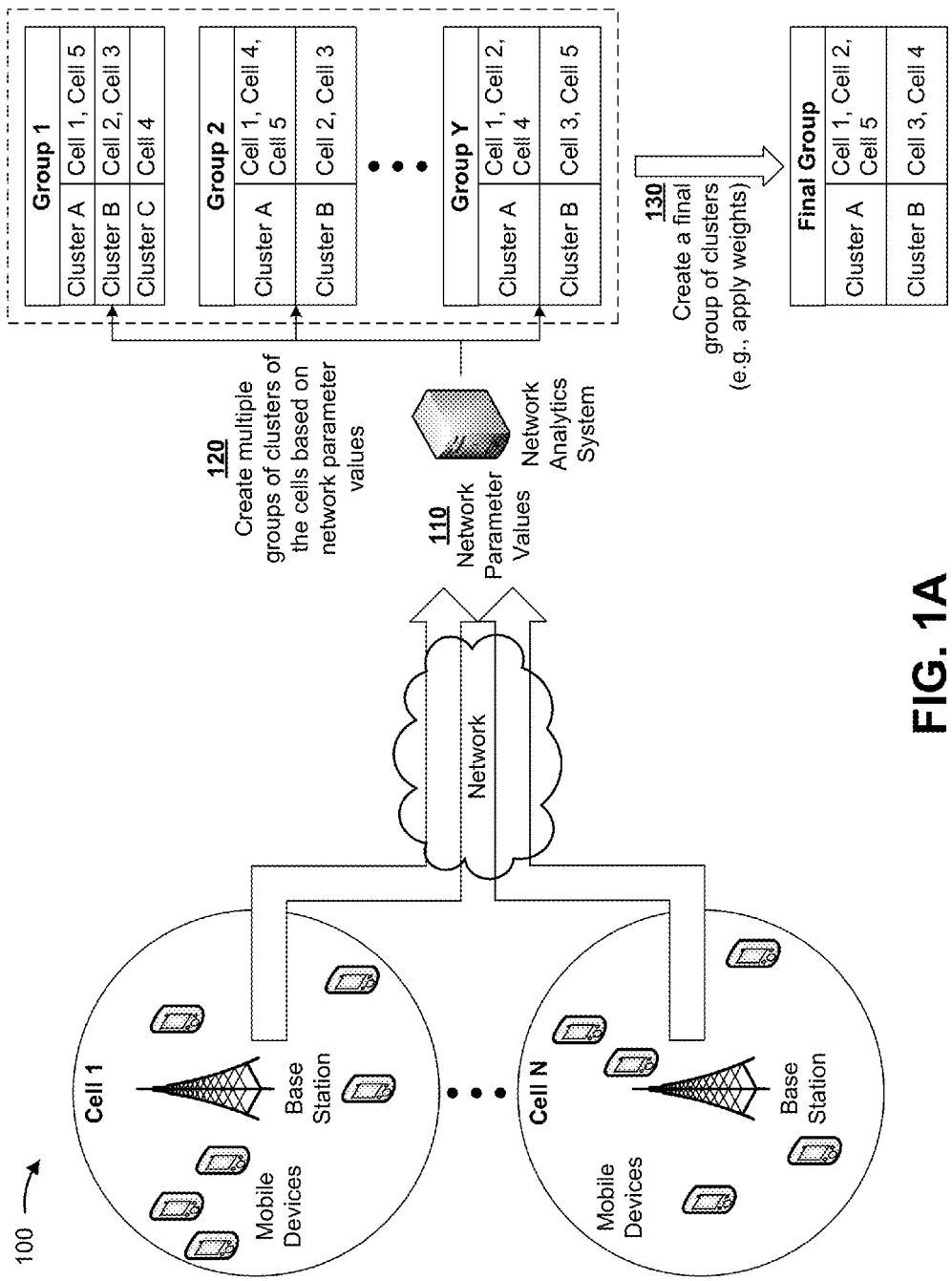
FIGS. 1A and 1B are diagrams of an overview of an example implementation described herein.
Figure 1B:
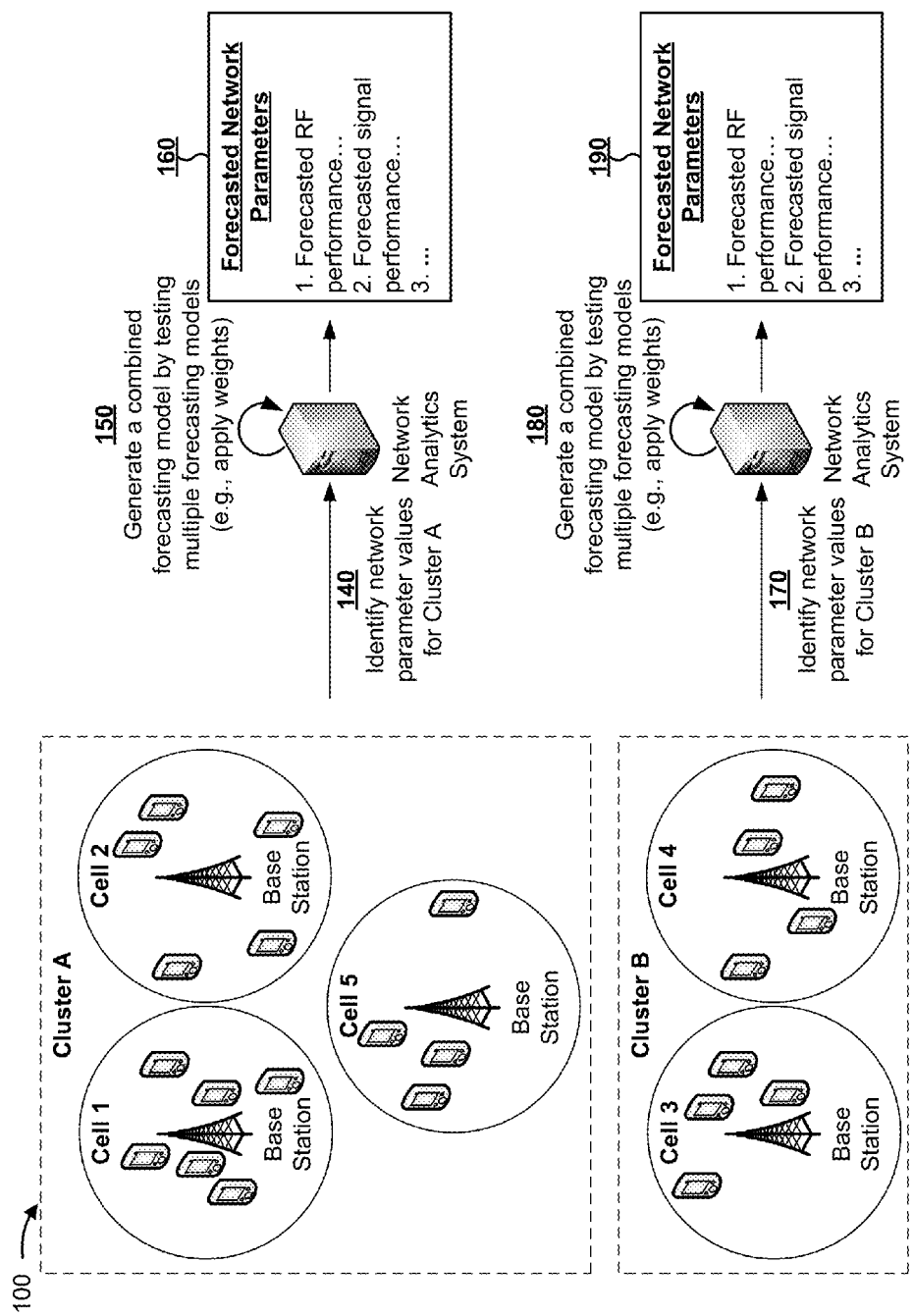

FIGS. 1A and 1B are diagrams of an overview of an example implementation 100 described herein. As shown in FIG. 1A, and by reference number 110, a network analytics system (e.g., a server or a group of servers) may receive network parameter values from multiple cells in a cellular network, shown as Cell 1 through Cell N (N>1). A network parameter may include, for example, a radio frequency (RF) performance parameter, a signaling performance parameter, a network traffic performance parameter, or the like. Example network parameters and network parameter values are described in more detail elsewhere herein. In some implementations, the network analytics system may identify a subset of the network parameter values to be used to cluster the cells, as described in more detail elsewhere herein. In this way, the network analytics system may conserve computing resources by analyzing a subset of the network parameter values rather than all of the network parameter values.

As shown by reference number 120, the network analytics system may create multiple groups of clusters of the cells based on the network parameter values. In some implementations, the network analytics system may apply different clustering techniques (e.g., clustering algorithms) to create different groups of cell clusters. As an example, assume that N=5 (e.g., there are 5 cells to be clustered). As shown, the network analytics system applies a first clustering technique to the five cells to generate a first group of cell clusters, shown as Group 1. In Group 1, the network analytics system has grouped Cell 1 and Cell 5 in Cluster A, has grouped Cell 2 and Cell 3 in Cluster B, and has grouped Cell 4 in Cluster C. As further shown, the network analytics system applies a second clustering technique to the five cells to generate a second group of cell clusters, shown as Group 2. In Group 2, the network analytics system has grouped Cell 1, Cell 4, and Cell 5 in Cluster A, and has grouped Cell 2 and Cell 3 in Cluster B. The network analytics system may apply multiple clustering techniques (shown as Y, where Y>1) to cluster the network cells into multiple groups of cells. These clustering techniques are described in more detail elsewhere herein.

As shown by reference number 130, the network analytics system may create a final group of cell clusters based on the multiple groups of clusters (e.g., based on Group 1 through Group Y). As an example, the network analytics system may apply weights to the different groups of clusters and/or the different clustering techniques, and may create the final group of clusters based on applying the weights. For example, and as shown, assume that the network analytics system creates a final group of clusters, with Cell 1, Cell 2, and Cell 5 in Cluster A, and with Cell 3 and Cell 4 in Cluster B. In this way, the network analytics system may account for deficiencies and inaccuracies in individual clustering techniques, and may create a group of cell clusters with similar characteristics, which may be used to more effectively and efficiently analyze cells clusters to predict network parameters for the cell clusters.

As shown in FIG. 1B, and by reference number 140, the network analytics system may identify network parameter values associated with cells included in Cluster A (e.g., Cell 1, Cell 2, and Cell 5), which have been clustered according to the clustering technique described above in connection with FIG. 1A. As shown by reference number 150, the network analytics system may generate a combined forecasting model to forecast network parameter values associated with the cluster of cells. For example, the network analytics system may test multiple forecasting models, and may apply weights to the forecasting models (e.g., based on errors associated with the forecasting models) to generate the combined forecasting model. These forecasting models are described in more detail elsewhere herein.

As shown by reference number 160, the network analytics system may apply the combined forecasting model to the network parameter values associated with Cluster A (e.g., including Cell 1, Cell 2, and Cell 5) to generate forecasted network parameter values for the cells included in Cluster A. For example, the network analytics system may forecast RF performance, may forecast signaling performance, may forecast network traffic performance, or the like. As shown by reference numbers 170, 180, and 190, the network analytics system may perform a similar process for the cells included in Cluster B. By clustering cells and combining forecasting models to generate forecasted network parameters, the network analytics system may conserve computing resources as compared to analyzing each cell individually, and may generate a more accurate forecast than if individual forecasting models were applied. Furthermore, the forecasted network parameters may be used to configure the network to improve network performance and increase the network capacity.

As indicated above, FIGS. 1A and 1B are provided merely as an example. Other examples are possible and may differ from what was described with regard to FIGS. 1A and 1B.

Figure 2:
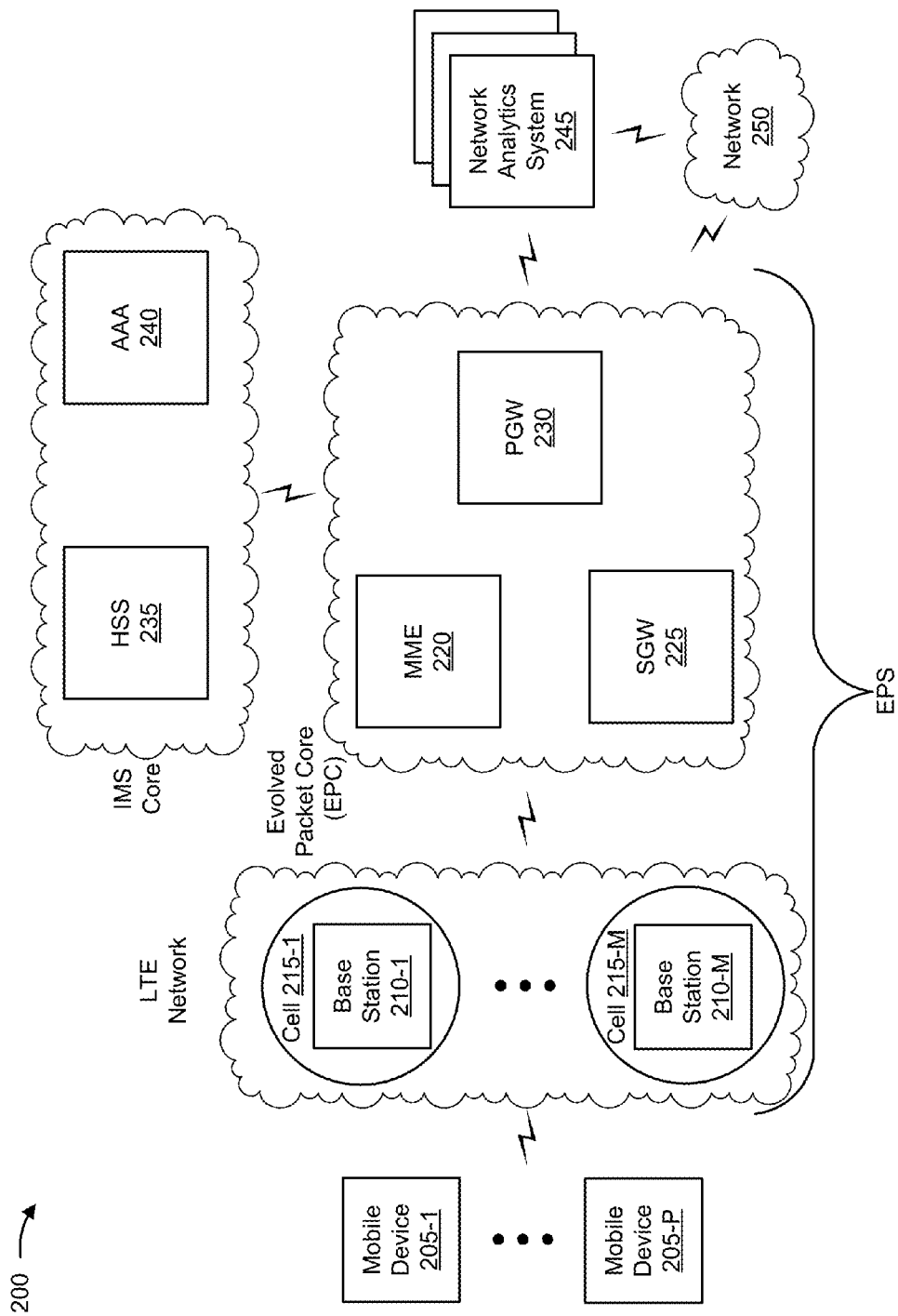
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more mobile devices 205-1 through 205-P (P≥1) (hereinafter referred to collectively as "mobile devices 205," and individually as "mobile device 205"); one or more base stations 210-1 through 210-M (M≥1) (hereinafter referred to collectively as "base stations 210," and individually as "base station 210"); one or more cells 215-1 through 215-M (hereinafter referred to collectively as "cells 215," and individually as "cell 215"); a mobility management entity device (MME) 220; a serving gateway (SGW) 225; a packet data network gateway (PGW) 230; a home subscriber server (HSS) 235; an authentication, authorization, and accounting server (AAA) 240; one or more network analytics systems 245; and a network 250. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network, a code division multiple access (CDMA) network, a GSM network, or the like.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which mobile device 205 communicates with the EPC. The EPC may include MME 220, SGW 225, and/or PGW 230 that enable mobile device 205 to communicate with network 250 and/or an Internet protocol (IP) multimedia subsystem (IMS) core. The IMS core may include HSS 235 and/or AAA 240, and may manage device registration and authentication, session initiation, etc., associated with mobile devices 205. HSS 235 and/or AAA 240 may reside in the EPC and/or the IMS core.

Mobile device 205 may include one or more devices capable of communicating with base station 210 and/or a network (e.g., network 250). For example, mobile device 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart watch, a pair of smart eyeglasses, etc.), and/or a similar device. Mobile device 205 may send traffic to and/or receive traffic from network 250 (e.g., via base station 210, SGW 225, and/or PGW 230).

Base station 210 may include one or more devices capable of transferring traffic, such as audio, video, text, data, and/or other traffic, destined for and/or received from mobile device 205. In some implementations, base station 210 may include an eNB associated with the LTE network that receives traffic from and/or sends traffic to network 250 via SGW 225 and/or PGW 230. Additionally, or alternatively, one or more base stations 210 may be associated with a RAN that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

Cell 215 may include a coverage area associated with base station 210. Mobile devices 205 located in a geographic region corresponding to the coverage area of cell 215 may communicate with base station 210 that serves cell 215. In some implementations, a particular geographic region may be included in multiple cells 215, such as when cells 215 overlap.

MME 220 may include one or more devices, such as one or more server devices, capable of managing authentication, activation, deactivation, and/or mobility functions associated with mobile device 205. In some implementations, MME 220 may perform operations relating to authentication of mobile device 205. Additionally, or alternatively, MME 220 may facilitate the selection of a particular SGW 225 and/or a particular PGW 230 to serve traffic to and/or from mobile device 205. MME 220 may perform operations associated with handing off mobile device 205 from a first base station 210 to a second base station 210 when mobile device 205 is transitioning from a first cell 215 associated with the first base station 210 to a second cell 215 associated with the second base station 210. Additionally, or alternatively, MME 220 may select another MME (not pictured), to which mobile device 205 should be handed off (e.g., when mobile device 205 moves out of range of MME 220).

SGW 225 may include one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 210 associated with the LTE network, and may send the aggregated traffic to network 250 (e.g., via PGW 230) and/or other network devices associated with the EPC and/or the IMS core. SGW 225 may also receive traffic from network 250 and/or other network devices, and may send the received traffic to mobile device 205 via base station 210. Additionally, or alternatively, SGW 225 may perform operations associated with handing off mobile device 205 to and/or from an LTE network.

PGW 230 may include one or more devices capable of providing connectivity for mobile device 205 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225, and may send the aggregated traffic to network 250. Additionally, or alternatively, PGW 230 may receive traffic from network 250, and may send the traffic to mobile device 205 via SGW 225 and base station 210. PGW 230 may record data usage information (e.g., byte usage), and may provide the data usage information to AAA 240.

HSS 235 may include one or more devices, such as one or more server devices, capable of managing (e.g., receiving, generating, storing, processing, and/or providing) information associated with mobile device 205. For example, HSS 235 may manage subscription information associated with mobile device 205, such as information that identifies a subscriber profile of a user associated with mobile device 205, information that identifies services and/or applications that are accessible to mobile device 205, location information associated with mobile device 205, a network identifier (e.g., a network address) that identifies mobile device 205, information that identifies a treatment of mobile device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

AAA 240 may include one or more devices, such as one or more server devices, that perform authentication, authorization, and/or accounting operations for communication sessions associated with mobile device 205. For example, AAA 240 may perform authentication operations for mobile device 205 and/or a user of mobile device 205 (e.g., using one or more credentials), may control access, by mobile device 205, to a service and/or an application (e.g., based on one or more restrictions, such as time-of-day restrictions, location restrictions, single or multiple access restrictions, read/write restrictions, etc.), may track resources consumed by mobile device 205 (e.g., a quantity of voice minutes consumed, a quantity of data consumed, etc.), and/or may perform similar operations.

Network analytics system 245 may include one or more devices (e.g., one or more network analysis devices) capable of receiving, generating, storing, processing, and/or providing information associated with one or more network parameters. For example, network analytics system 245 may include a server, a group of servers (e.g., in a data center, a cloud computing environment, etc.), or the like. Network analytics system 245 may receive network parameter values from one or more devices included in environment 200, may analyze the network parameter values, and may provide information based on analyzing the network parameter values, as described in more detail elsewhere herein. In some implementations, network analytics system 245 may be internal to the EPS (e.g., in the EPC, the IMS Core, etc.). In some implementations, network analytics system may be external from the EPS (e.g., may communicate with devices of environment 200 via network 250).

Network 250 may include one or more wired and/or wireless networks. For example, network 250 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
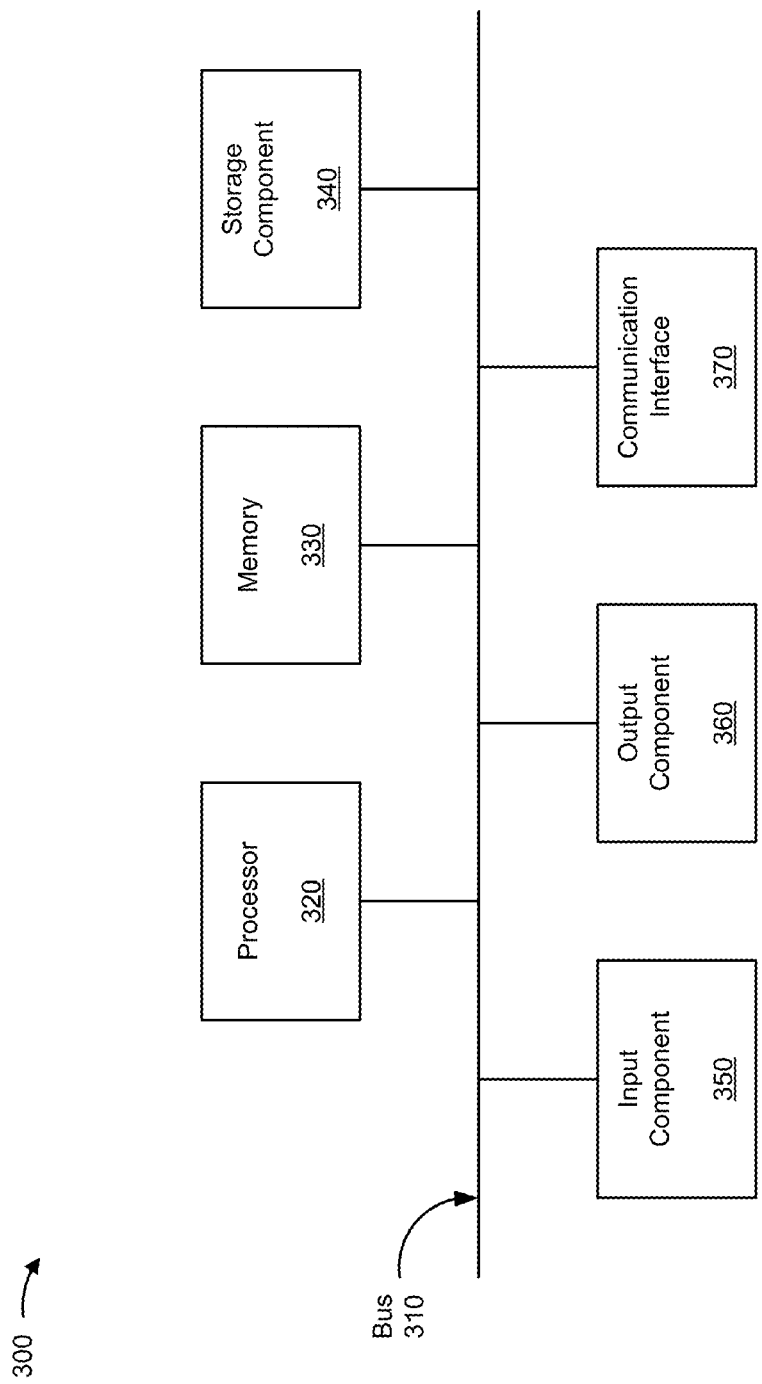
FIG. 3 is a diagram of example components of one or more devices of FIG. 2.

FIG. 3 is a diagram of example components of a device 300. Device 300 may correspond to mobile device 205, base station 210, MME 220, SGW 225, PGW 230, HSS 235, AAA 240, and/or network analytics system 245. In some implementations, mobile device 205, base station 210, MME 220, SGW 225, PGW 230, HSS 235, AAA 240, and/or network analytics system 245 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
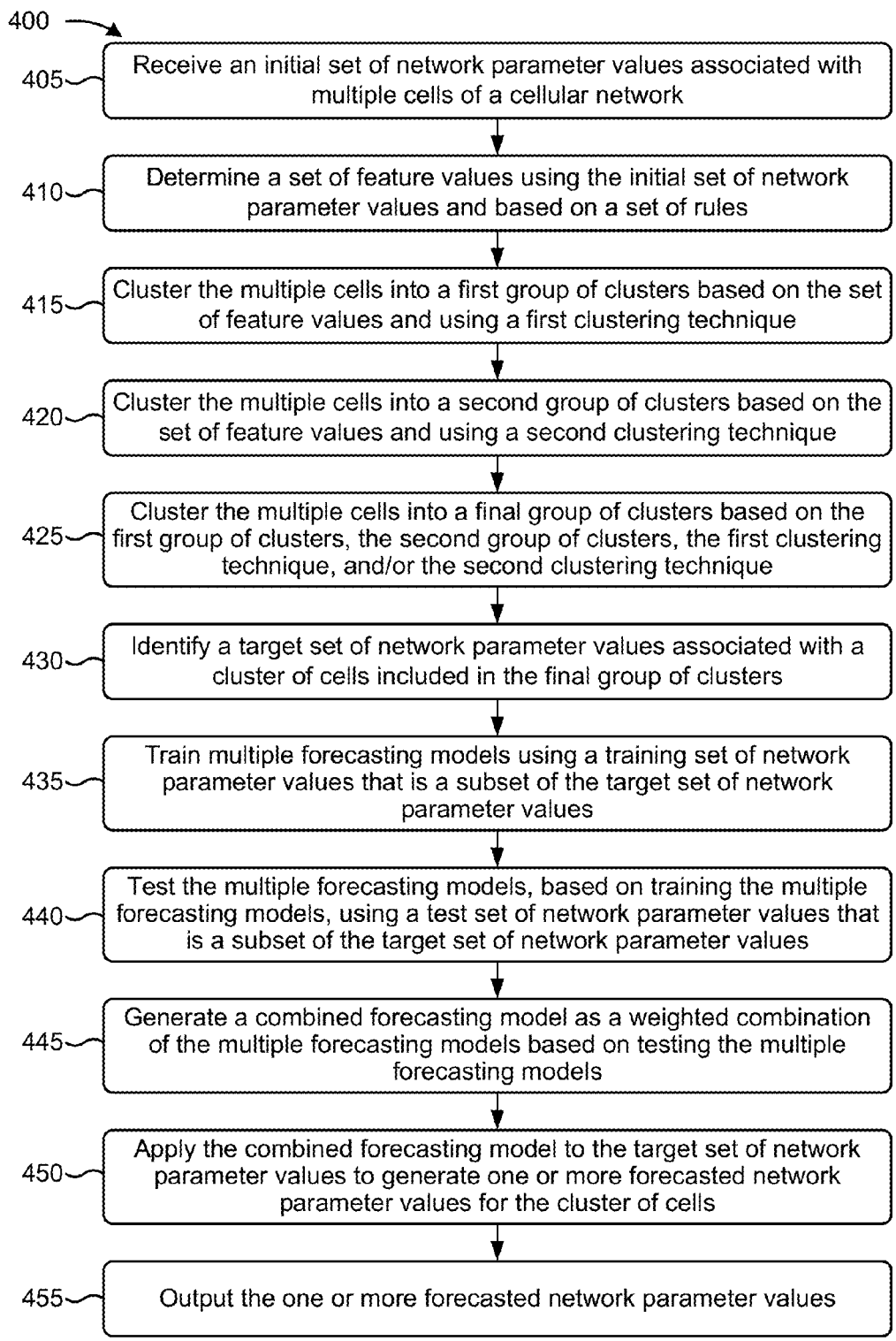
FIG. 4 is a flow chart of an example process for clustering cells of a cellular network based on network parameters and predicting network parameter values for clustered cells.

FIG. 4 is a flow chart of an example process 400 for clustering cells of a cellular network based on network parameters and predicting network parameter values for clustered cells. In some implementations, one or more process blocks of FIG. 4 may be performed by network analytics system 245. In some implementations, one or more process blocks of FIG. 4 may be performed by another device or a group of devices separate from or including network analytics system 245, such as mobile device 205, base station 210, MME 220, SGW 225, PGW 230, HSS 235, and/or AAA 240.

As shown in FIG. 4, process 400 may include receiving an initial set of network parameter values associated with multiple cells of a cellular network (block 405). For example, network analytics system 245 may receive an initial set of network parameter values. The network parameter values may be associated with multiple cells 215 of a cellular network. A network parameter may include a measurable or calculable parameter associated with a cellular network, and a network parameter value may be a value that represents the measured or calculated parameter. For example, a network parameter may include a reference signal received power (RSRP) parameter, and a network parameter value for this parameter may include an RSRP parameter value (e.g., −94 decibel-milliwatts (dBm)). Network analytics system 245 may receive network parameter values from one or more devices associated with the cellular network, such as one or more devices shown in FIG. 2. For example, network analytics system 245 may receive one or more network parameter values from mobile device 205 and/or base station 210 associated with one or more cells 215 (e.g., via one or more other devices shown in FIG. 2).

In some implementations, the network parameter may include an RF performance parameter that indicates a performance of RF communication(s) associated with base station 210 (e.g., between base station 210 and mobile device 205), such as an RSRP parameter, a received signal code power (RSCP) parameter, a reference signal received quality (RSRQ) parameter, a signal-to-interference-plus-noise (SINR) parameter, a received signal strength indicator (RSSI) parameter, a received energy per chip and interference level (Ec/Io) parameter, a block error ratio (BLER) parameter, or the like.

Additionally, or alternatively, the network parameter may include a signaling performance parameter that indicates performance of one or more signaling functions of base station 210, such as a radio resource control (RRC) connection setup success rate (or failure rate), a radio access bearer setup success rate (or failure rate), a call setup failure rate (or failure rate), a handover success rate (or failure rate), a call drop rate, or the like.

Additionally, or alternatively, the network parameter may include a network traffic performance parameter that indicates performance of network traffic associated with base station 210, such as a packet loss parameter, a jitter parameter, a latency parameter, a throughput parameter, a traffic volume parameter, a parameter that indicates a quantity of active mobile devices 205, or the like. Additionally, or alternatively, the network parameter may include a capacity parameter that indicates a capacity associated with base station 210.

Additionally, or alternatively, the network parameter may include one or more key performance indicators (KPIs) from one or more KPI categories associated with 3GPP. For example, the network parameter may include an accessibility parameter (e.g., a call setup success rate), a retainability parameter (e.g., a call drop rate), an availability parameter (e.g., a percentage of time that network service is available), an integrity parameter (e.g., a blocking rate), a mobility parameter (e.g., a handover success rate), or the like. In some implementations, network analytics system 245 may receive, in the initial set of network parameter values, at least one KPI from each of the above five KPI categories.

In some implementations, network analytics system 245 may receive configuration information that indicates which network parameters are to be collected, stored, and/or processed to cluster cells 215 into multiple groups of clusters. In some implementations, network analytics system 245 may request network parameters (e.g., from base station 210 and/or another device of FIG. 2) based on the configuration information. Additionally, or alternatively, network analytics system 245 may receive a set of network parameters, and may identify a subset of the network parameters to be stored and/or processed based on the configuration information.

In some implementations, network analytics system 245 may receive the initial set of network parameter values over time (e.g., periodically, at a pre-configured interval, at regular time intervals, at irregular time intervals, in a time series, etc.). For example, network analytics system 245 may receive a first network parameter value at a first time, and may receive a second network parameter value at a second time. The second network parameter value may be associated with the same network parameter as the first network parameter value, in some implementations. Additionally, or alternatively, network analytics system 245 may receive and/or store a time indicator that indicates a time (e.g., a date, a time, etc.) at which a network parameter value was measured, calculated, indexed, and/or stored. In this way, network analytics system 245 may use the initial set of network parameter values to analyze network conditions over time.

The initial set of network parameter values may be associated with multiple cells 215 of a cellular network, and network analytics system 245 may use the initial set of network parameter values to cluster multiple cells 215 into multiple groups of clusters, as described in more detail below.

As further shown in FIG. 4, process 400 may include determining a set of feature values using the initial set of network parameter values and based on a set of rules (block 410). For example, network analytics system 245 may receive and/or store a set of rules that indicate which network parameter values or calculations from network parameter values are to be extracted and/or processed to cluster cells 215 into multiple groups of clusters. For example, network analytics system 245 may receive and/or store an initial set of network parameter values, and the set of rules may indicate a subset of values to be extracted from the initial set of network parameter values. Additionally, or alternatively, the set of rules may indicate a set of values to be calculated based on the initial set of network parameter values. In some implementations, network analytics system 245 may receive and/or store a large quantity of network parameter values (e.g., hundreds, thousands, tens of thousands, millions, trillions, etc. of network parameter values), and may apply the set of rules to conserve computing resources by reducing a quantity of values that are to be stored and/or processed to cluster cells 215 into multiple groups of clusters. This reduced set of values may be referred to as a set of feature values.

In some implementations, the set of rules may indicate that a particular type of value is to be directly obtained (e.g., extracted) from the initial set of network parameter values and included in the set of feature values. As an example, the set of rules may indicate that the largest value (e.g., the maximum value) included in the set of network parameter values is to be included in the set of feature values. As another example, the set of rules may indicate that the smallest value (e.g., the minimum value) included in the set of network parameter values is to be included in the set of feature values. As another example, the set of rules may indicate that a particular quantile value, included in the set of network parameter values, is to be included in the set of feature values. The particular quantile value may include, for example, a 5% quantile value, a 95% quantile value, or the like.

Additionally, or alternatively, the set of rules may indicate that a particular type of value is to be calculated from the initial set of network parameter values and included in the set of feature values. As an example, the set of rules may indicate that the average value of the set of network parameter values is to be included in the set of feature values. The average value may include, for example, the mean value, the median value, the mode value, more than one of these values, or the like. As another example, the set of rules may indicate that a variance of the set of network parameter values is to be included in the set of feature values. The variance may refer to the sum of squared differences between a set of values and a mean of the set of values, divided by the total number of values. As another example, the set of rules may indicate that a skewness of the set of network parameter values is to be included in the set of feature values. The skewness may refer to a measure of asymmetry of the probability distribution of a set of values to the mean of the set of values. As another example, the set of rules may indicate that a kurtosis of the set of network parameter values is to be included in the set of feature values. The kurtosis may refer to a measure that describes a shape of the probability distribution of a set of values.

Additionally, or alternatively, the set of rules may indicate that a particular test statistic value or exponent is to be calculated using the initial set of network parameter values and included in the set of feature values. In some implementations, a test statistic value or exponent may be calculated from a time series of the initial set of network parameter values, based on time indicators associated with network parameter values. For example, the set of rules may indicate that a value indicative of the Box-Pierce test statistic of independence calculated for the initial set of network parameter values, a value indicative of the Ljung-Box test statistic of independence calculated for the initial set of network parameter values, a value indicative of the Tsay's test statistic of nonlinearity calculated for the initial set of network parameter values, a value indicative of the Hurst exponent calculated for the initial set of network parameter values, a value indicative of the Lyapunov exponent (e.g., the greatest Lyapunov exponent) calculated for the initial set of network parameter values, a value indicative of periodicity calculated for the initial set of network parameter values, or the like, are to be included in the set of feature values.

Additionally, or alternatively, the set of rules may indicate that the initial set of network parameter values are to be decomposed using a regression algorithm (e.g., a local regression algorithm). For example, the initial set of network parameter values may be decomposed into a trend element, a seasonal element, and an irregular element. A trend value may be determined from the trend element, and may indicate whether the network parameter value is increasing over time, decreasing over time, or whether there is no trend (e.g., may indicate a trend pattern). A seasonal value may be determined from the seasonal element, and may indicate a periodicity of the network parameter values over time (e.g., whether there are seasonal patterns over time). The set of rules may indicate that the trend value and/or the seasonal value are to be included in the set of feature values.

In some implementations, the set of rules may indicate a statistic to be calculated from the irregular element of the initial set of network parameter values. The irregular element may refer to a pattern of data that is not part of a trend pattern or a seasonal pattern. In some implementations, the statistic may include a Box-Pierce test statistic of independence calculated for the irregular element, a Tsay's test statistic of nonlinearity calculated for the irregular element, a skewness calculated for the irregular element, a kurtosis calculated for the irregular element, or the like. The set of rules may indicate one or more statistics to be included in the set of feature values.

Network analytics system 245 may determine, as part of the set of feature values, one or more feature values for each network parameter to be analyzed. For example, network analytics system 245 may determine one or more feature values for a first network parameter, one or more feature values for a second network parameter, etc. In this way, network analytics system 245 may receive and/or store a large quantity of network parameter values (e.g., hundreds, thousands, tens of thousands, millions, trillions, etc. of network parameter values), and may apply the set of rules to conserve computing resources by reducing a quantity of values that are to be stored and/or processed to cluster cells 215 into multiple groups of clusters.

As further shown in FIG. 4, process 400 may include clustering the multiple cells into a first group of clusters based on the set of feature values and using a first clustering technique (block 415), and clustering the multiple cells into a second group of clusters based on the set of feature values and using a second clustering technique (block 420). For example, network analytics system 245 may analyze the set of feature values to cluster multiple cells 215 into a first group of clusters, a second group of clusters, etc. As used herein, a group of clusters may refer to multiple clusters that, when taken as a whole, include all of the multiple cells 215 being analyzed. For example, a first group of clusters may include all cells 215, a second group of clusters may include all cells 215, etc. A cluster may refer to a grouping of one or more cells 215. For example, a cluster may refer to multiple cells 215 that are classified together due to a high similarity of features. Thus, a group of clusters, taken as a whole, may include all of the multiple cells 215, while an individual cluster may include one or more cells 215.

Network analytics system 245 may apply a first clustering technique (e.g., a first clustering algorithm) to cluster multiple cells 215 into the first group of clusters, may apply a second clustering technique (e.g., a second clustering algorithm) to cluster the multiple cells 215 into the second group of clusters, etc. While described herein as generating a first group of clusters and a second group of clusters, network analytics system 245 may generate any number of groups of clusters, such as three groups of clusters, four groups of clusters, etc. Each group of clusters may classify all of the multiple cells 215 into two or more clusters, and each group of clusters may be generated using a different clustering technique.

In some implementations, network analytics system 245 may use a distance-based clustering technique to cluster multiple cells 215 into a group of clusters. For example, network analytics system 245 may use a k-means clustering technique, a k-medoids clustering technique, a fuzzy c-means clustering technique, a clustering large applications (CLARA) clustering technique, or the like. In some implementations, network analytics system 245 may use different ones of these clustering techniques to cluster multiple cells 215 into different groups of clusters.

In some implementations, network analytics system 245 may use a distribution-based clustering technique to cluster multiple cells 215 into a group of clusters. For example, network analytics system 245 may use a Gaussian mixture model (GMM) clustering technique, a probabilistic latent semantic analysis (PLSA) clustering technique (e.g., a Gaussian PLSA clustering technique), an agglomerative hierarchical clustering technique, or the like. In some implementations, network analytics system 245 may use different ones of these clustering techniques to cluster multiple cells 215 into different groups of clusters.

In some implementations, network analytics system 245 may determine an initial quantity of clusters to be included in a group of clusters. In some implementations, network analytics system 245 may be configured with the initial quantity of clusters (e.g., a default value). As an example, network analytics system 245 may determine the initial quantity of clusters, k, based on the quantity of cells 215 to be clustered, n. For example, network analytics system 245 may determine k as follows:

$$k=\sqrt{n/2}$$

As further shown in FIG. 4, process 400 may include clustering the multiple cells 215 into a final group of clusters based on the first group of clusters, the second group of clusters, the first clustering technique, and/or the second clustering technique (block 425). For example, network analytics system 245 may generate a final group of clusters based on multiple groups of clusters (e.g., a first group of clusters, a second group of clusters, a third group of clusters) and multiple corresponding clustering techniques used to generate the multiple groups of clusters (e.g., a first clustering technique, a second clustering technique, a third clustering technique, etc.). In some implementations, network analytics system 245 may apply weights to the groups of clusters and/or clustering techniques, and may generate the final group of clusters based on the weights.

In some implementations, network analytics system 245 may generate a co-association matrix for each group of clusters (and corresponding clustering techniques). A co-association matrix may refer to a square matrix, where the number of rows and the number of columns in the co-association matrix is equal to the number of cells 215 being clustered (e.g., the total number of cells 215 to be analyzed and grouped into clusters). The value of an element (i, j) in the co-association matrix for a clustering technique may be set equal to 1 if cell i and cell j are included in the same cluster when the clustering technique is applied. Conversely, an element (i,j) in the co-association matrix for a clustering technique may be set equal to 0 if cell i and cell j are not included in the same cluster when the clustering technique is applied.

Network analytics system 245 may generate a consensus matrix from multiple co-association matrices corresponding to the multiple clustering techniques. The consensus matrix may be an average (e.g., a mean) of all of the generated co-association matrices. For example, assume that z groups of clusters are generated using z different clustering techniques. In this case, a consensus matrix $M_{consensus}$ may be generated from each co-association matrix $M_n$ as follows:

$$M_{consensus} := \frac{1}{z}\sum_{n=1}^{z} M_n$$

Some elements of the consensus matrix may be equal to a fractional value (e.g., a value between 0 and 1). Network analytics system 245 may convert fractional values to 0 or 1, such as by rounding a fractional value to 0 if the fractional value is less than a threshold value (e.g., 0.5), and rounding the fractional value to 1 if the fractional value is not less than the threshold value. In some implementations, network analytics system 245 may be configured with the threshold value. Additionally, or alternatively, network analytics system 245 may be configured to round the fractional value up or down when the fractional value is equal to the threshold. A final matrix with all elements equal to zero or one may be referred to as a final co-association matrix, or as an ensemble matrix.

Network analytics system 245 may use the ensemble matrix to cluster the multiple cells 215 into a final group of clusters. For example, network analytics system 245 may cluster cell i and cell j in the same cluster if element (i,j) of the ensemble matrix is equal to one. Conversely, network analytics system 245 may separate cell i and cell j into different clusters if element (i,j) of the ensemble matrix is equal to zero. In some cases, the final group of clusters may include a different quantity of clusters than a quantity of clusters included in one or more of the multiple groups of clusters. Additionally, or alternatively, different groups of clusters in the multiple groups of clusters may include a different quantity of clusters.

In some implementations, network analytics system 245 may output information that identifies the final group of clusters. For example, network analytics system 245 may provide this information for presentation via a user interface, such that a network operator may easily determine which cells 215 in a cellular network show high similarity. By generating multiple groups of clusters using multiple clustering techniques, and then creating a final group of clusters based on the multiple groups, network analytics system 245 may improve an accuracy of the final group of clusters such that cells 215 with similar characteristics are grouped together. Furthermore, network analytics system 245 may use the final group of clusters to forecast network parameters associated with cells 215, which may be used to improve network performance.

As further shown in FIG. 4, process 400 may include identifying a target set of network parameter values associated with a cluster of cells included in the final group of clusters (block 430). For example, network analytics system 245 may identify a target set of network parameter values. The target set of network parameter values may be associated with a particular cluster of cells 215 included in the final group of clusters, determined as described above. For example, the target set of network parameter values may be a subset of the initial set of network parameter values, may be a subset of the set of feature values, or the like.

In some implementations, when network analytics system 245 receives and/or stores the initial set of network parameter values and/or the set of feature values, network analytics system 245 may store a cell identifier in association with a network parameter value and/or a feature value. The cell identifier may identify a cell 215 (e.g., a base station 210) with which a network parameter value and/or feature value is associated (e.g., a cell 215 for which the value was measured, obtained, calculated, etc.). Network analytics system 245 may use cell identifiers for cells 215 included in a particular cluster to identify the target set of network parameter values associated with those cells 215 included in the particular cluster. Network analytics system 245 may use the target set of network parameter values to forecast network parameter values for a cell cluster, as described in more detail below.

In some implementations, network analytics system 245 may determine multiple sets of network parameter values corresponding to multiple clusters of cells 215. For example, network analytics system 245 may determine a first set of network parameter values for a first cluster included in the final group of clusters, may determine a target set of network parameter values (e.g., a second set of network parameter values) for a second cluster included in the final group of clusters, may determine a third set of network parameter values for a third cluster included in the final group of clusters, etc.

As further shown in FIG. 4, process 400 may include training multiple forecasting models using a training set of network parameter values that is a subset of the target set of network parameter values (block 435), and testing the multiple forecasting models, based on training the multiple forecasting models, using a test set of network parameter values that is a subset of the target set of network parameter values (block 440). For example, network analytics system 245 may extract a training set of network parameter values from the target set of network parameter values. Network analytics system 245 may use the training set to train multiple forecasting models (e.g., using a machine learning technique). Network analytics system 245 may also extract a test set of network parameter values from the target set of network parameter values. After training the forecasting models, network analytics system 245 may test the forecasting models using the test set.

In some implementations, the test set may be different from the training set. For example, the test set and the training set may be mutually exclusive. Additionally, or alternatively, when combined, the test set and the training set may be the same as the target set of network parameter values. In other words, network analytics system 245 may divide the target set of network parameter values into two sets of network parameter values, which are the training set and the test set. Additionally, or alternatively, the training set and the test set may share some network parameter values.

The multiple forecasting models may include, for example, two or more of an autoregressive forecasting model, a moving average forecasting model, an autoregressive moving average forecasting model, an autoregressive integrated moving average forecasting model, an exponential smoothing forecasting model (e.g., a Holt-Winters forecasting model), a vector autoregression forecasting model, a structural vector autoregression forecasting model, a structural vector error correction forecasting model, a general autoregressive conditional heteroscedasticity forecasting model, a support vector machine forecasting model, a Fourier forecasting model, or the like.

As further shown in FIG. 4, process 400 may include generating a combined forecasting model as a weighted combination of the multiple forecasting models based on testing the multiple forecasting models (block 445). For example, network analytics system 245 may generate a combined forecasting model based on the multiple forecasting models. In some implementations, network analytics system 245 may generate the combined forecasting model as a weighted combination of the multiple forecasting models. Network analytics system 245 may determine weights corresponding to different forecasting models based on testing the forecasting models.

In some implementations, network analytics system 245 may determine an error associated with a forecasting model, and may determine a weight to be applied to the forecasting model based on the error. For example, network analytics system 245 may determine the error based on testing the forecasting model. The test may produce a result and an error associated with the result. The error may include, for example, a root mean square error, an ordinary least square error, an Akaike information criterion error, a least absolute deviations error, or the like. A weight for a forecasting model may correspond to an error associated with the forecasting model. For example, network analytics system 245 may assign a higher weight to a forecasting model with a smaller error, and may assign a lower weight to a forecasting model with a larger error. Network analytics system 245 may assign a weight to each of the multiple forecasting models to generate the combined forecasting model.

In some implementations, network analytics system 245 may apply multiple weighting techniques to the forecasting models (e.g., using different types of errors) to generate multiple combined forecasting models. Network analytics system 245 may train and/or test the multiple combined forecasting models, as described above, and may select the combined forecasting model with the least error. In some implementations, network analytics system 245 may use a validation set of network parameter values to train and/or test the multiple combined forecasting models. The validation set may be different from the training set and/or the test set, in some implementations.

As an example, network analytics system 245 may generate a first combined forecasting model by assigning the same weight to each forecasting model, may generate a second combined forecasting model by removing a particular quantity (e.g., one, two, etc.) or percentage (e.g., 20%, 25%, etc.) of forecasting models and assigning weights (e.g., the same weight, different weights, etc.) to the remaining forecasting models, may generate a third combined forecasting model by assigning weights to each forecasting model based on an error associated with each forecasting model, or the like. Additionally, or alternatively, network analytics system 245 may generate a combined forecasting model by performing any combination of the techniques described above. In this way, network analytics system 245 may determine a combined forecasting model that more accurately forecasts (e.g., predicts) network parameter values than any individual forecasting model.

In some implementations, network analytics system 245 may generate a different combined forecasting model for different clusters. For example, a first combined forecasting model for a first cluster of cells 215 may be associated with the lowest error out of all combined forecasting models determined for the first cluster, a second combined forecasting model for a second cluster of cells 215 may be associated with the lowest error out of all combined forecasting models determined for the second cluster, etc. In this way, network analytics system 245 may increase the accuracy of forecasts for different clusters of cells 215.

As further shown in FIG. 4, process 400 may include applying the combined forecasting model to the target set of network parameter values to generate one or more forecasted network parameter values for the cluster of cells (block 450). For example, network analytics system 245 may apply the combined forecasting model to the target set of network parameter values to generate forecasted network parameter values. The forecasted network parameter values may be associated with a particular cluster of cells 215 included in the final group of cells 215. In some implementations, network analytics system 245 may perform a similar technique for each cluster, thereby forecasting network parameter values for each cluster of cells 215. Because a cluster of cells 215 includes cells 215 with similar characteristics, the forecasted network parameter values for a cluster may be accurate for each cell 215 included in the cluster.

As further shown in FIG. 4, process 400 may include outputting the one or more forecasted network parameter values (block 455). For example, network analytics system 245 may output the forecasted network parameter values. In some implementations, network analytics system 245 may output the forecasted network parameter values for presentation via a user interface, such that a network operator may analyze the forecasted network parameter values to improve network performance. Additionally, or alternatively, network analytics system 245 may analyze the forecasted network parameters, and may output information based on the analysis. For example, network analytics system 245 may compare a forecasted network parameter value to a threshold, and may output, for presentation, an alert if the forecasted network parameter value satisfies the threshold.

Additionally, or alternatively, network analytics system 245 may store a set of action rules to automatically improve network performance by performing one or more actions based on the forecasted network parameter values. For example, network analytics system 245 may provide an instruction to a network device (e.g., one or more devices shown in FIG. 2) based on analyzing the forecasted network parameter values. As an example, if a forecasted network parameter value associated with a particular cell 215 satisfies a threshold, then network analytics system 245 may provide an instruction to base station 210 associated with the particular cell 215.

By combining multiple forecasting models to generate a combined forecasting model, and then using the combined forecasting model to forecast network parameter values for clustered cells 215, network analytics system 245 may improve an accuracy of the forecasted network parameter values for a cell 215. Furthermore, network analytics system 245 may use the forecasted network parameters to improve network performance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein assist in clustering cells with similar characteristics, and in analyzing those clusters of cells to predict network parameters in the cell clusters. By clustering cells, computing resources, such as memory resources, processing resources, or the like, may be conserved as compared to storing and processing a large volume of data for all cells. Furthermore, by predicting network parameters, the network may be configured to improve network performance.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
   receive a set of network parameter values associated with multiple cells of a cellular network,
      the set of network parameter values being measured or calculated based on communications associated with the multiple cells of the cellular network;
   determine a set of feature values, associated with the multiple cells of the cellular network, using the set of network parameter values and based on a set of rules,
      a quantity of the set of feature values being less than a quantity of the set of network parameter values;
   cluster the multiple cells of the cellular network into a first group of clusters using a first clustering technique that clusters the multiple cells into the first group of clusters based on the set of feature values;
   cluster the multiple cells of the cellular network into a second group of clusters using a second clustering technique that clusters the multiple cells into the second group of clusters based on the set of feature values,
      the second group of clusters being different from the first group of clusters,
      the second clustering technique being different from the first clustering technique;
   cluster the multiple cells of the cellular network into a final group of clusters based on the first group of clusters and the second group of clusters; and
   output information associated with the final group of clusters of the multiple cells of the cellular network.

2. The device of claim 1, where the one or more processors, when receiving the set of network parameter values, are to:
   receive at least a portion of the set of network parameter values via a base station associated with a cell of the multiple cells of the cellular network.

3. The device of claim 1, where the set of network parameter values includes at least one of:
   a radio frequency performance parameter associated with the cellular network,
   a signaling performance parameter associated with the cellular network, or
   a network traffic performance parameter associated with the cellular network.

4. The device of claim 1, where the set of feature values includes a subset of the set of network parameter values.

5. The device of claim 1, where the set of feature values includes at least one of:
   a first value included in the set of network parameter values, or
   a second value calculated from one or more values included in the set of network parameter values.

6. The device of claim 1, where the first group of clusters includes all of the multiple cells of the cellular network; and
   where the second group of clusters includes all of the multiple cells of the cellular network.

7. The device of claim 1, where the set of network parameter values is a first set of network parameter values; and
   where the one or more processors are further to:
   identify a second set of network parameter values associated with a cluster of cells included in the final group of clusters;
   train multiple forecasting models using a third set of network parameter values that is a subset of the second set of network parameter values;
   test the multiple forecasting models, based on training the multiple forecasting models, using a fourth set of network parameter values that is a subset of the second set of network parameter values;
   generate a combined forecasting model based on testing the multiple forecasting models;
   generate one or more forecasted network parameter values for the cluster of cells using the combined forecasting model; and
   output the one or more forecasted network parameter values associated with the cluster of cells.

8. A non-transitory computer-readable medium storing instructions, the instructions comprising:
   one or more instructions that, when executed by one or more processors, cause the one or more processors to:
   receive a set of network parameter values associated with multiple cells of a cellular network,
      the set of network parameter values being measured or calculated based on communications associated with the multiple cells of the cellular network;
   determine a set of feature values, associated with the multiple cells of the cellular network, using the set of network parameter values and based on a set of rules;
   cluster the multiple cells of the cellular network into a first group of clusters using a first clustering technique that clusters the multiple cells into the first group of clusters based on the set of feature values;
   cluster the multiple cells of the cellular network into a second group of clusters using a second clustering technique that clusters the multiple cells into the second group of clusters based on the set of feature values,
the second clustering technique being different from the first clustering technique;
cluster the multiple cells of the cellular network into a final group of clusters based on the first group of clusters and the second group of clusters; and
output information associated with the final group of clusters of the multiple cells of the cellular network.

9. The non-transitory computer-readable medium of claim 8, where the one or more instructions, that cause the one or more processors to receive the set of network parameter values, cause the one or more processors to:
receive the set of network parameter values from one or more devices associated with the cellular network.

10. The non-transitory computer-readable medium of claim 8, where the set of network parameter values includes at least one of:
an accessibility parameter associated with the cellular network,
a retainability parameter associated with the cellular network,
an availability parameter associated with the cellular network,
an integrity parameter associated with the cellular network, or
a mobility parameter associated with the cellular network.

11. The non-transitory computer-readable medium of claim 8, where the set of feature values includes:
a first value included in the set of network parameter values, and
a second value calculated based on a plurality of values included in the set of network parameter values.

12. The non-transitory computer-readable medium of claim 8, where the one or more instructions, when executed by the one or more processors, further cause the one or more processors to:
identify a target set of network parameter values associated with a cluster of cells included in the final group of clusters;
train multiple forecasting models using a training set of network parameter values;
test the multiple forecasting models, based on training the multiple forecasting models, using a test set of network parameter values;
generate a combined forecasting model based on testing the multiple forecasting models;
generate one or more forecasted network parameter values associated with the cluster of cells using the combined forecasting model; and
output the one or more forecasted network parameter values associated with the cluster of cells.

13. The non-transitory computer-readable medium of claim 12, where the one or more instructions, that cause the one or more processors to generate the combined forecasting model, cause the one or more processors to:
generate the combined forecasting model as a weighted combination of the multiple forecasting models.

14. The non-transitory computer-readable medium of claim 12, where the one or more instructions, when executed by the one or more processors, further cause the one or more processors to:
determine an action to be taken to improve operation of the cellular network based on the one or more forecasted network parameter values; and
perform the action.

15. A method, comprising:
receiving, by a device, a set of network parameter values associated with multiple cells of a cellular network,
the set of network parameter values being measured or calculated based on communications associated with the multiple cells of the cellular network;
determining, by the device, a set of feature values, associated with the multiple cells of the cellular network, using the set of network parameter values and based on a set of rules;
generating, by the device, a first group of clusters of the multiple cells of the cellular network using a first clustering technique that clusters the multiple cells into the first group of clusters based on the set of feature values;
generating, by the device, a second group of clusters of the multiple cells of the cellular network using a second clustering technique that clusters the multiple cells into the second group of clusters based on the set of feature values,
the second clustering technique being different from the first clustering technique;
generating, by the device, a final group of clusters of the multiple cells of the cellular network based on the first group of clusters and the second group of clusters; and
providing, by the device, information that identifies the final group of clusters of the multiple cells of the cellular network.

16. The method of claim 15, where the set of network parameter values includes network parameter values measured by a base station of the cellular network at different times.

17. The method of claim 15, further comprising:
identifying a target set of network parameter values associated with a cluster of cells included in the final group of clusters;
training multiple forecasting models using a training set of network parameter values;
testing the multiple forecasting models, based on training the multiple forecasting models, using a test set of network parameter values;
generating a combined forecasting model based on testing the multiple forecasting models;
generating one or more forecasted network parameter values associated with the cluster of cells using the combined forecasting model; and
providing the one or more forecasted network parameter values associated with the cluster of cells.

18. The method of claim 17, further comprising:
identifying an instruction to be provided to a network device, associated with the cellular network, based on at least one forecasted network parameter value of the one or more forecasted network parameter values; and
providing the instruction to the network device.

19. The method of claim 17, further comprising:
determining that at least one forecasted network parameter value, of the one or more forecasted network parameter values, satisfies a threshold; and
performing an action associated with the cellular network based on determining that the at least one forecasted network parameter value satisfies the threshold.

20. The method of claim 17, further comprising:
determining that at least one forecasted network parameter value, of the one or more forecasted network parameter values, satisfies a threshold; and providing an alert based on determining that the at least one forecasted network parameter value satisfies the threshold.

\* \* \* \* \*